(12) United States Patent
Zivari et al.

(10) Patent No.: US 10,974,387 B2
(45) Date of Patent: *Apr. 13, 2021

(54) ALIGNMENT TOOL FOR FASTENER FEED MECHANISM

(71) Applicant: The Boeing Company, Chicago, IL (US)

(72) Inventors: Kia Miriam Zivari, Seattle, WA (US); Zachary David Talus, Seattle, WA (US); Derek John Deans, Arlington, WA (US)

(73) Assignee: The Boeing Company, Chicago, IL (US)

(*) Notice: Subject to any disclaimer, the term of this patent is extended or adjusted under 35 U.S.C. 154(b) by 62 days.

This patent is subject to a terminal disclaimer.

(21) Appl. No.: 16/431,284

(22) Filed: Jun. 4, 2019

(65) Prior Publication Data

US 2019/0314994 A1 Oct. 17, 2019

Related U.S. Application Data

(63) Continuation of application No. 15/676,224, filed on Aug. 14, 2017, now Pat. No. 10,350,759.

(51) Int. Cl.
  *G01B 5/25* (2006.01)
  *B25J 9/16* (2006.01)

(52) U.S. Cl.
  CPC .......... *B25J 9/1687* (2013.01); *G01B 5/25* (2013.01); *G05B 2219/45064* (2013.01); *Y10S 901/45* (2013.01)

(58) Field of Classification Search
  CPC .................................................. B25J 9/1687
  USPC ........................................... 33/613, 645
  See application file for complete search history.

(56) References Cited

U.S. PATENT DOCUMENTS

| | | | | |
|---|---|---|---|---|
| 3,488,856 A | * | 1/1970 | Wiklund | G01B 5/12 33/544.2 |
| 4,848,592 A | * | 7/1989 | Shemeta | B25J 9/04 221/211 |
| 5,205,047 A | * | 4/1993 | Danielli | G01B 7/13 33/542 |
| 5,288,292 A | * | 2/1994 | Giraud | G01B 3/18 33/512 |

(Continued)

FOREIGN PATENT DOCUMENTS

WO 0061328 A1 10/2000

OTHER PUBLICATIONS

Chinese Office Action; Application 2018108999252; dated Feb. 3, 2021.

*Primary Examiner* — George B Bennett
(74) *Attorney, Agent, or Firm* — Duft & Bornsen, PC

(57) ABSTRACT

Systems and methods are provided for aligning a fastener feed mechanism. One embodiment is an apparatus that includes an alignment tool that aligns a fastener feed mechanism with a chamber of a fastening device that receives fasteners. The alignment tool includes a tip section having a diameter less than a diameter of the chamber, a chamber fit section that extends from an end of the tip section in a lengthwise direction and has a diameter corresponding with the diameter of the chamber, a lip that protrudes radially from the chamber beyond the diameter of the chamber, and a fitting member that extends from the lip in the lengthwise direction.

23 Claims, 11 Drawing Sheets

(56) References Cited

U.S. PATENT DOCUMENTS

| | | | | |
|---|---|---|---|---|
| 5,729,906 | A * | 3/1998 | Banks | B21J 15/022 |
| | | | | 33/544 |
| 6,338,203 | B1 * | 1/2002 | Strickland | B25H 7/005 |
| | | | | 33/529 |
| 6,415,526 | B1 * | 7/2002 | Buckner, III | G01B 3/28 |
| | | | | 33/522 |
| 7,748,127 | B1 * | 7/2010 | Cosimano | G01C 15/002 |
| | | | | 33/286 |
| 10,330,453 | B2 * | 6/2019 | Rup | G01B 3/002 |
| 10,350,759 | B2 * | 7/2019 | Zivari | G01B 5/25 |
| 2007/0180723 | A1 * | 8/2007 | Morgan | B21D 28/04 |
| | | | | 33/645 |
| 2013/0336784 | A1 * | 12/2013 | Sankolli | F16B 19/02 |
| | | | | 415/220 |
| 2014/0112729 | A1 * | 4/2014 | Wilkins | B23G 1/32 |
| | | | | 409/66 |
| 2018/0043540 | A1 * | 2/2018 | Satou | B25J 9/1687 |

* cited by examiner

FRONT

BACK

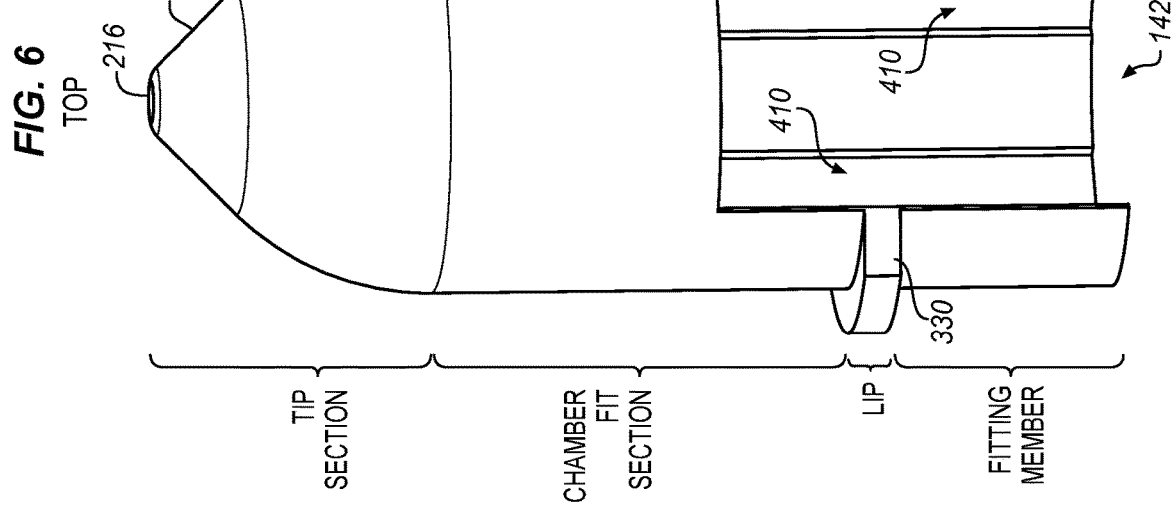
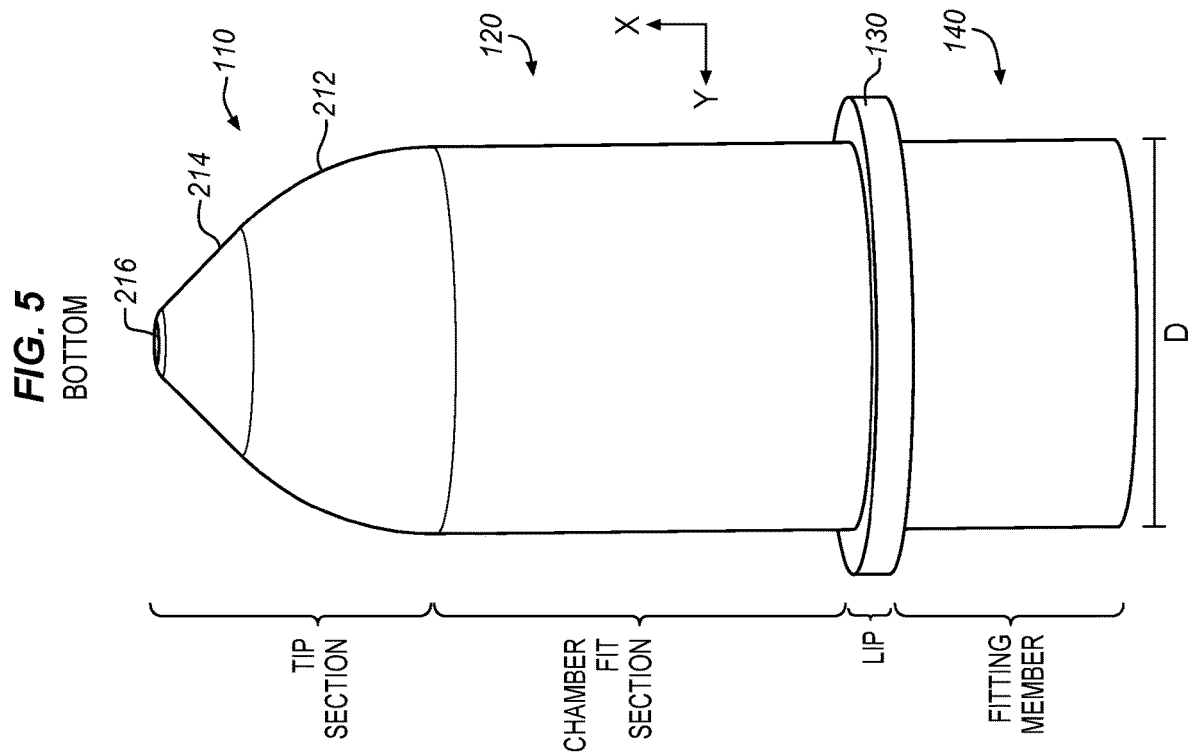

BACK

FRONT

ALIGNMENT TOOL FOR FASTENER FEED MECHANISM

FIELD

The disclosure relates to the field of robotics, and in particular, to alignment tools for automated robots.

BACKGROUND

Robots that engage in fabrication may be carefully positioned and oriented to ensure that they perform work on desired locations of a product. For example, a robot that applies fasteners to a product may be calibrated to ensure that it consistently applies fasteners in a precise manner.

In advanced manufacturing environments, it is not uncommon for multiple robots to engage in collaborative fabrication of a product. However, the use of multiple robots necessarily complicates the process of calibrating the robots. For example, a larger number of robots must be calibrated. Furthermore, the calibration of some robots may be made dependent on the calibration of other robots, forcing calibration to become a multi-step process.

Therefore, it would be desirable to have a method and apparatus that take into account at least some of the issues discussed above, as well as other possible issues.

SUMMARY

Embodiments described herein provide alignment tools that facilitate the alignment of a feed mechanism with a corresponding robot. These alignment tools may for example ensure alignment between an arm of a fastener feed mechanism, and a chamber of a fastening robot. The alignment tools described herein ensure axial alignment with a chamber, which in turn reduces the chances of collision or interference while operating within the chamber.

One embodiment is an apparatus that includes an alignment tool that aligns a fastener feed mechanism with a chamber of a fastening device that receives fasteners. The alignment tool includes a tip section having a diameter less than a diameter of the chamber, a chamber fit section that extends from an end of the tip section in a lengthwise direction and has a diameter corresponding with the diameter of the chamber, a lip that protrudes radially from the chamber beyond the diameter of the chamber, and a fitting member that extends from the lip in the lengthwise direction.

A further embodiment is a method. The method includes placing a fitting member of an alignment tool onto an arm of a fastener feed mechanism, loosening components of the fastener feed mechanism that control a position of the fastener feed mechanism, and sliding the alignment tool into a chamber until a lip of the alignment tool prevents further insertion of the alignment tool into the chamber. The method also includes adjusting the components of the fastener feed mechanism to maintain a position of the arm determined during the alignment.

A further embodiment is a system that includes a fastener feed mechanism. The fastener feed mechanism includes multiple arms that rotate about a central axis to deliver fasteners to a chamber of a fastening device, an actuator that drives rotation of the arms about the central axis, and gripping tools that extend from each arm for holding fasteners being delivered to the chamber. The system also includes an alignment tool that aligns a fastener feed mechanism with a chamber of a fastening device that receives fasteners. The alignment tool includes a tip section having a diameter less than a diameter of the chamber, a chamber fit section that extends from a second end of the tip section in a lengthwise direction and has a diameter corresponding with the diameter of the chamber, a lip that protrudes radially from the chamber beyond the diameter of the chamber, and a fitting member that extends from the chamber in the lengthwise direction.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 1-6 are views of an alignment tool in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

FIGS. 1-6 are views of alignment tool 100 in an exemplary embodiment. Alignment tool 100 comprises any system, device, or component operable to facilitate alignment of a fastener feed mechanism with a fastening device, such as a robot. Specifically, alignment tool 100 may be placed onto a fastener feed mechanism that provides fasteners to the robot. Alignment tool 100 may be placed onto the fastener feed mechanism, and utilized to physically align the fastener feed mechanism with a cylinder at a robot that receives the fasteners. In this manner, the fastener feed mechanism will properly deliver fasteners to the robot.

Figure 1:
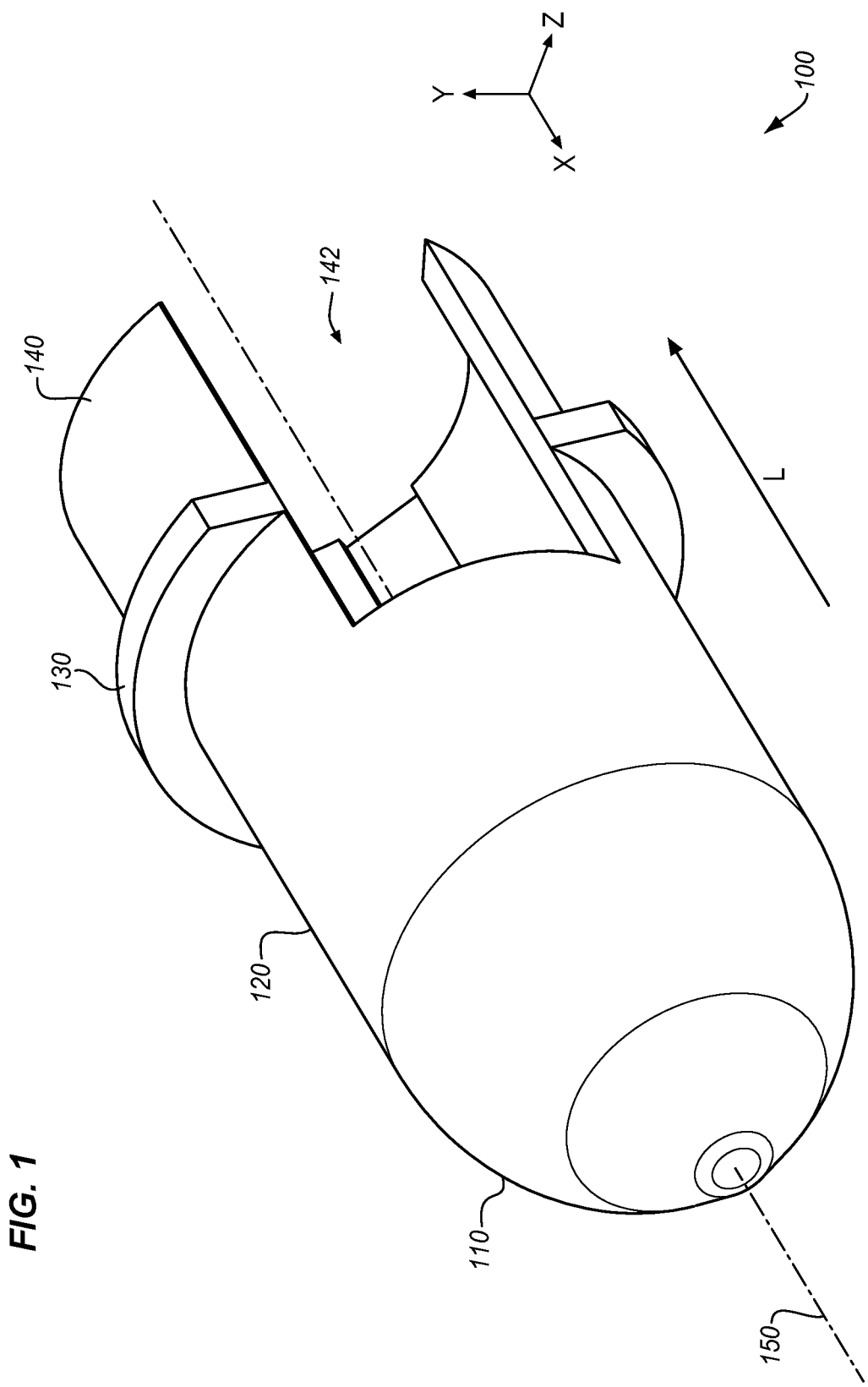
Figure 7:
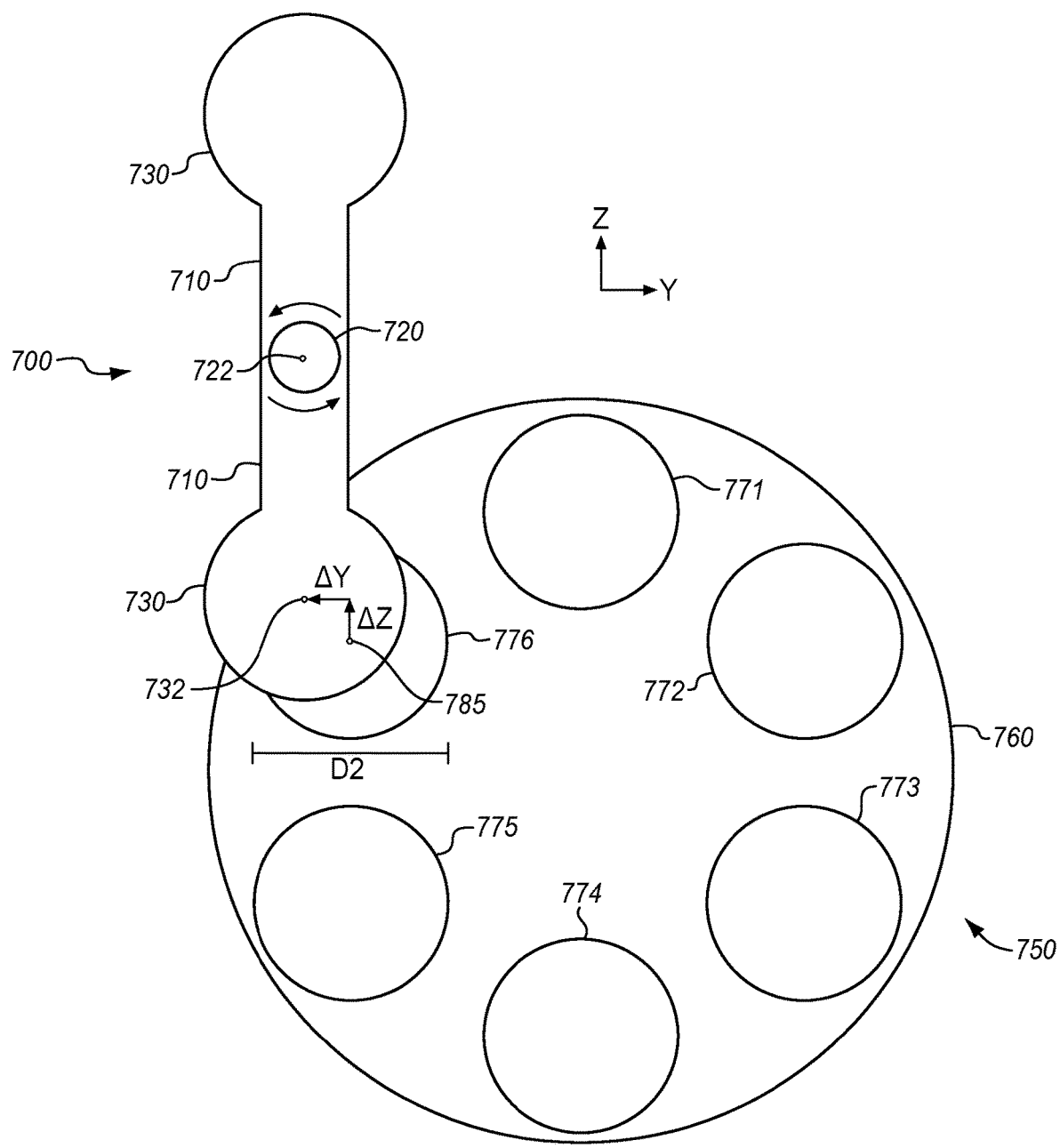
FIG. 7 is a back view of a fastener feed mechanism that cooperates with a robot in an exemplary embodiment.

In this embodiment depicted in FIG. 1, alignment tool 100 comprises tip section 110, which is inserted into the chamber, and chamber fit section 120, which follows tip section 110 into a chamber (e.g., chamber 776 of FIG. 7). Alignment tool 100 further comprises lip 130 and fitting member 140. Lip 130 extends radially outward with respect to central axis 150. Fitting member 140 defines cut-out volume 142, which fits over a portion of an arm of a fastener feed mechanism.

Figure 2:
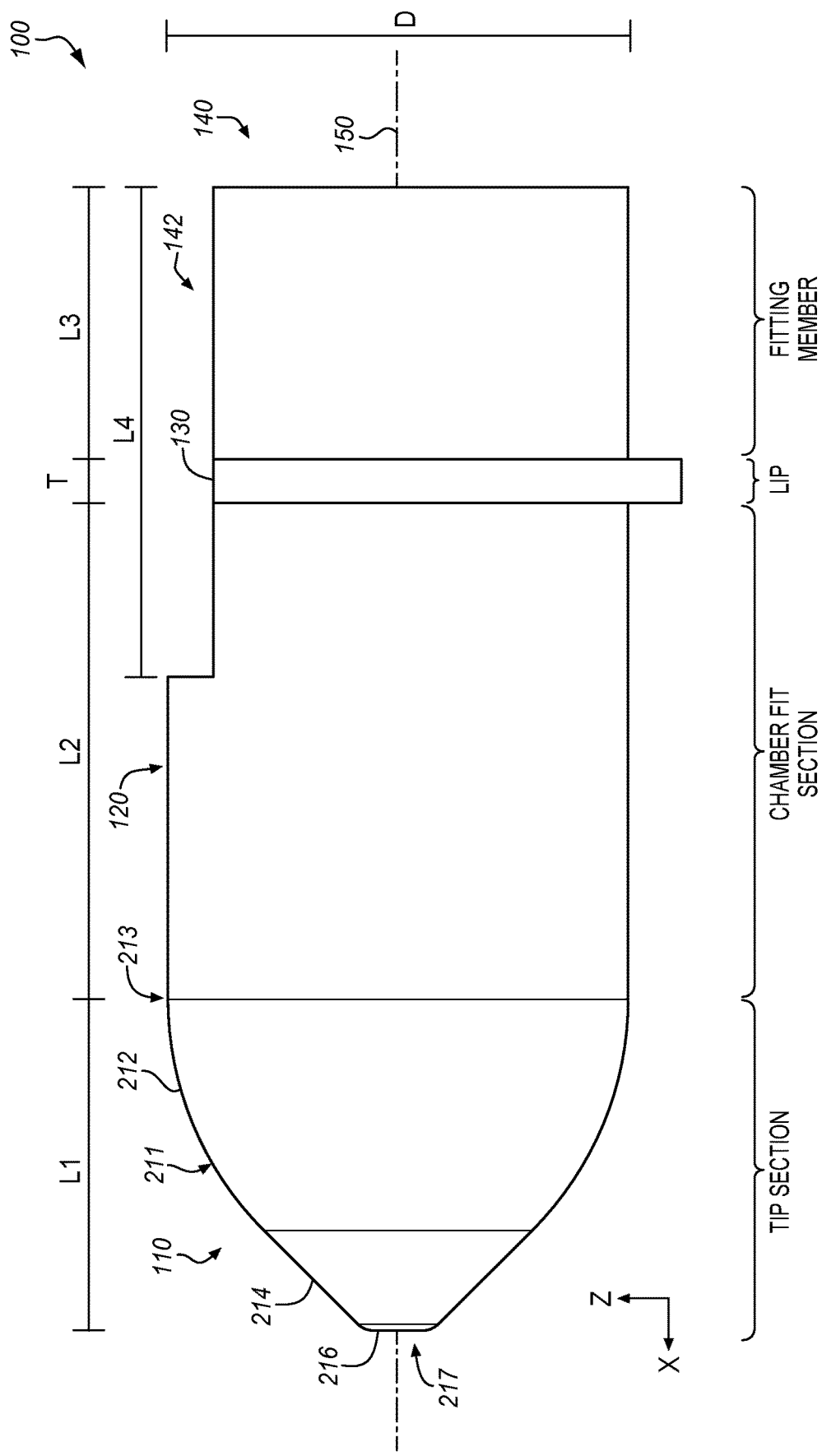

FIG. 2 is a side view of alignment tool 100 of FIG. 1. FIG. 2 illustrates that tip section 110 may include tip 216 defining a first end 217, cone 214, and ogive 212 which follows curve 211. Tip section 110 increases in diameter as distance from tip 216 increases along a lengthwise direction (L) (e.g., as X decreases). Curve 211 may form a circular arc of greater radius than the diameter of chamber fit section 120. FIG. 2 further illustrates that chamber fit section 120 has a diameter D, tip section 110 has a length L1, chamber fit section has a length L2, fitting member 140 has a length of L3, and lip 130 has a thickness T. Chamber fit section 120 is attached to tip section 110 at second end 213. Cut-out volume 142 is also visible. In this embodiment, cut-out volume 142 extends a length of L4, continuing through lip 130 and into chamber fit section 120.

Figure 3:
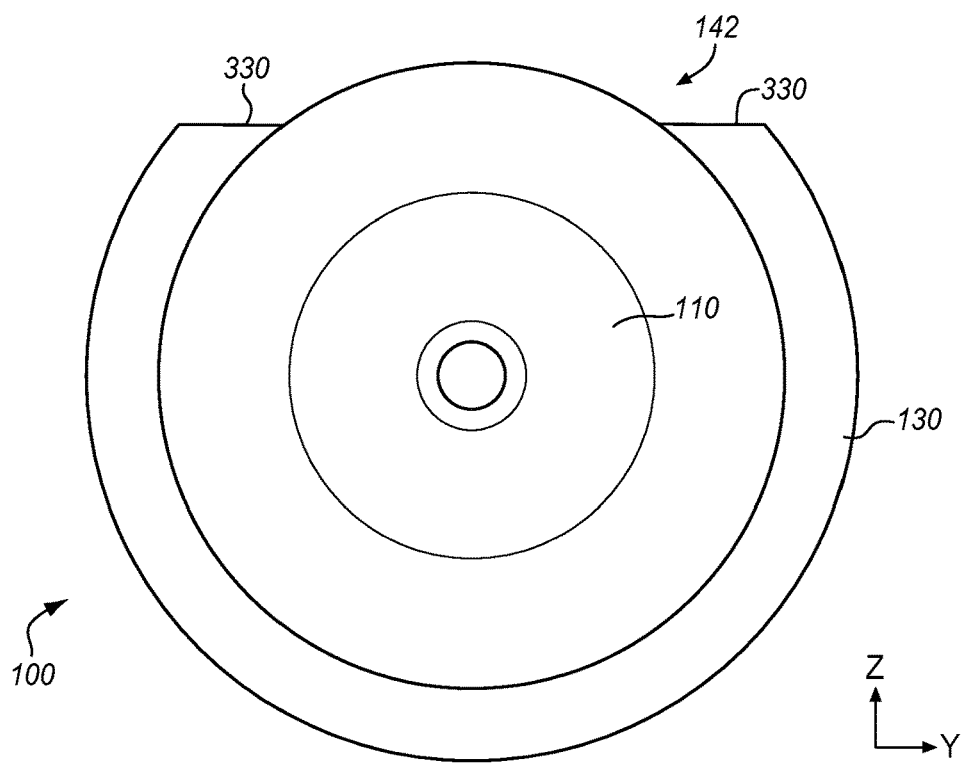
Figure 4:
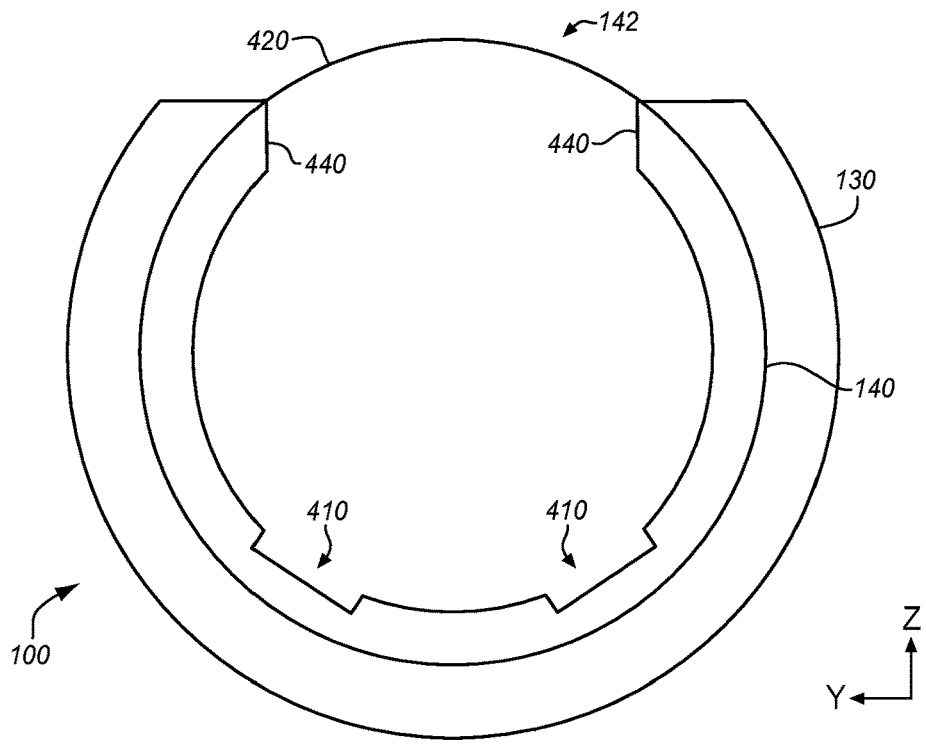

FIGS. 3 and 4 are front and back views, respectively, of alignment tool 100 of FIG. 1. FIG. 3 illustrates ends 330 of lip 130 where lip 130 has been removed by cut-out volume 142. FIG. 4 illustrates backstop 420, which defines a boundary of cut out volume 142. FIG. 4 further illustrates ends 440 of fitting member 140, as well as cut-outs 410. Cut-outs 410 are additional portions of cut-out volume 142 that may correspond with components of an arm to which alignment tool 100 is mounted. For example, cut-outs 410 may define channels that correspond with the locations of set screws (not shown) at fastener feed mechanism 800 of FIG. 8.

FIGS. 5-6 are bottom and top views, respectively, of alignment tool 100 of FIG. 1. FIGS. 5-6 further illustrate the various components discussed above. Alignment tool 100 may be made out of any suitable material, such as plastics, rubber, silicone, etc. In many embodiments, alignment tool 100 is made from a material that is softer than the robots and/or fastener feed mechanisms being aligned (e.g., softer than tool steel). This ensures that alignment tool 100 does not damage or scratch any components to which it is mounted.

Figure 8:
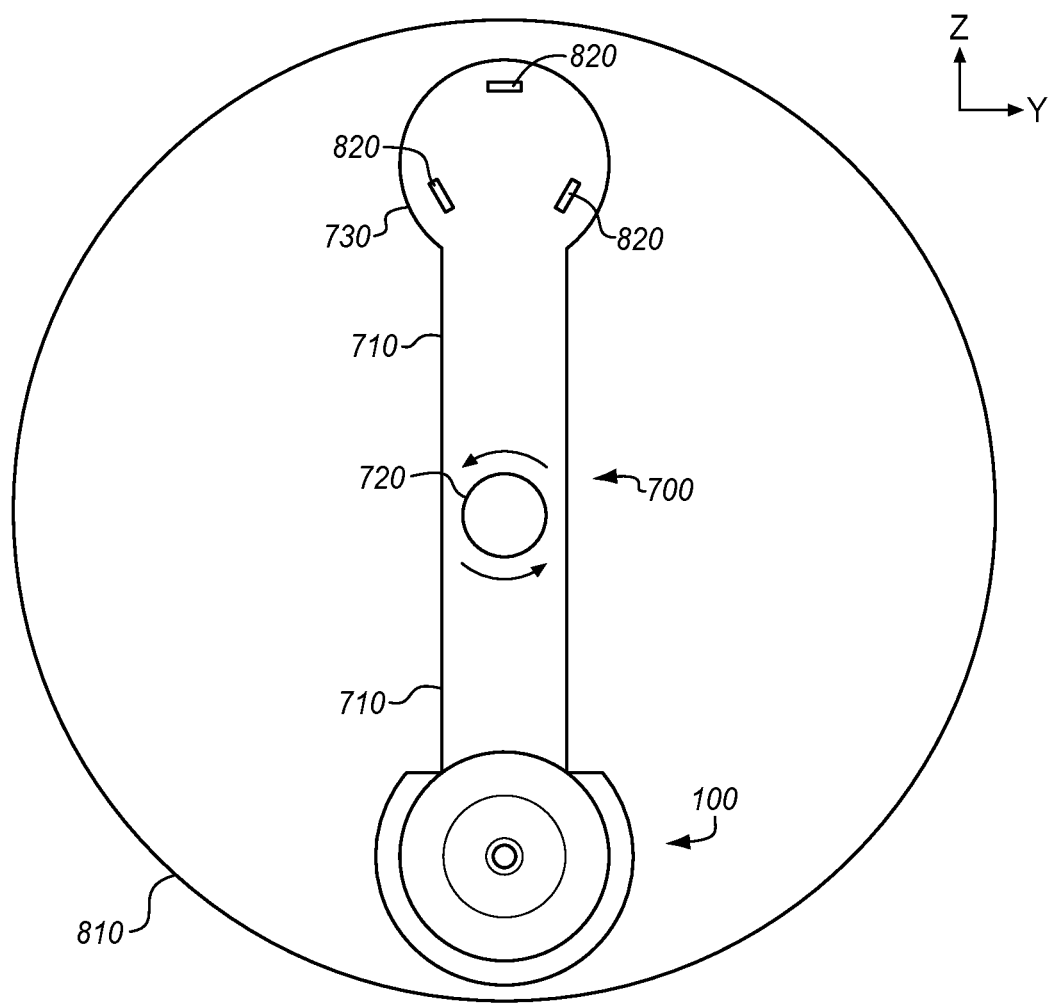
FIG. 8 is a front view of a fastener feed mechanism that includes an alignment tool mounted thereon in an exemplary embodiment.
Figure 9:
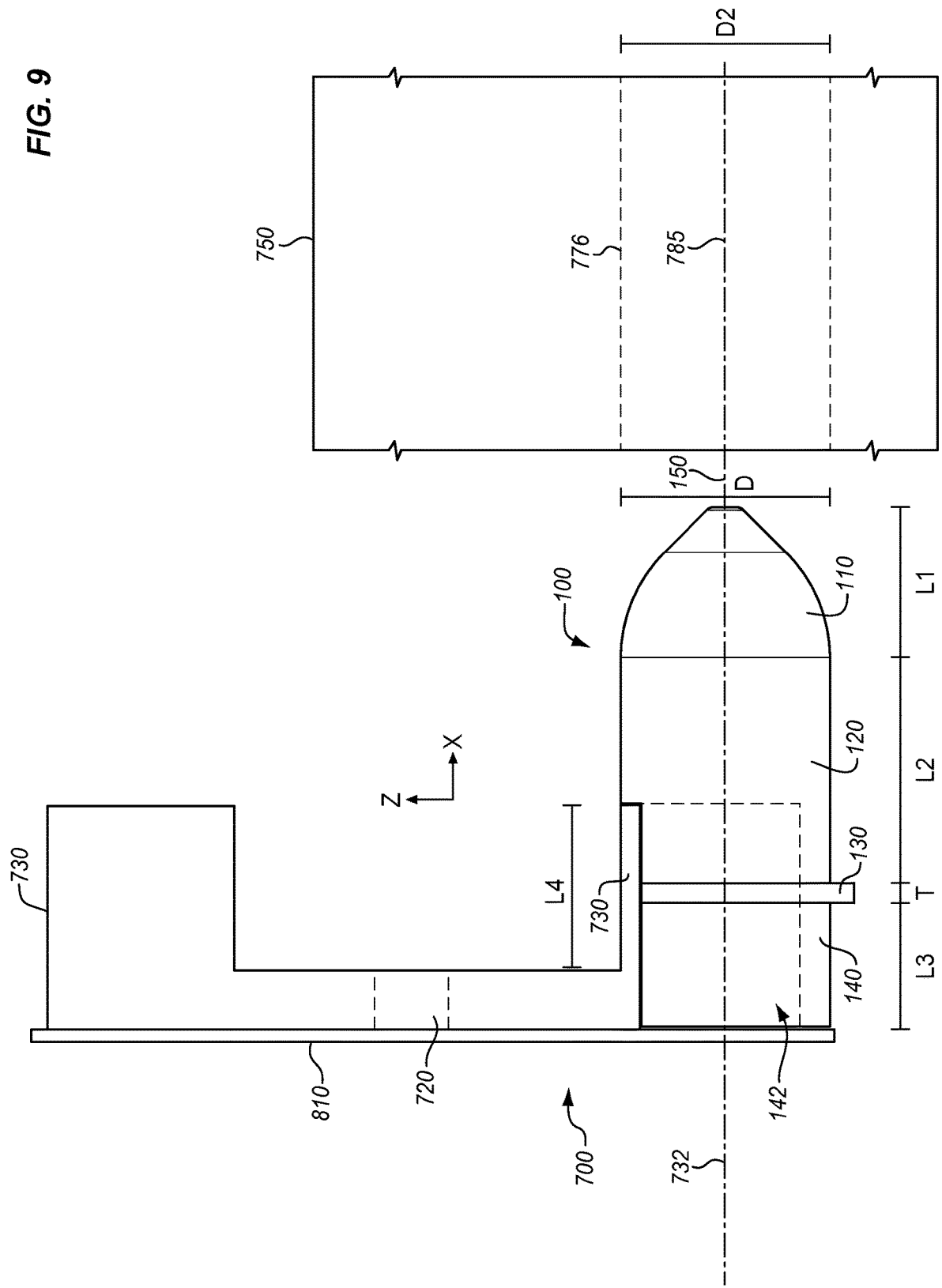
FIGS. 9-10 are side views of an alignment tool mounted to a fastener feed mechanism in an exemplary embodiment.

FIGS. 7-9 illustrate environments in which alignment tool 100 may be utilized. Specifically, FIG. 7 is a back view of a fastener feed mechanism 700, which rotates and delivers fasteners to chamber 776 for use by robot 750. In this embodiment, fastener feed mechanism 700 includes multiple arms 710 having distal portions 730. Fastener feed mechanism 700 rotates about central axis 722 in response to force applied by actuator 720. That is, actuator 720 drives rotation of arms 710. Assume, for this embodiment, that fastener feed mechanism 700 of FIG. 7 is presently misaligned along X (i.e., normal to the plane of the drawing, such that it proceeds into/out of the page), Y, and Z with respect to chamber 776 defined by body 760 of robot 750 (as indicated by ΔY and ΔZ of FIG. 7). Specifically, central axis 732 of distal portion 730 is not collinear with central axis 785 of chamber 776. This means that fastener feed mechanism 700 may not feed fasteners as efficiently as desired to chamber 776 of robot 750. Remaining chambers 771-775 may include other components for robot 750, such as sensors, control systems, etc. Each chamber has an inner diameter D2, which may correspond with outer diameter D of chamber fit section 120 of alignment tool 100 (as shown in FIG. 5).

In order to facilitate alignment, an alignment tool 100 is placed at a distal portion 730 of an arm 710 of fastener feed mechanism 700 as shown in FIG. 8. For example, alignment tool 100 may slip fit over distal portion 730. While fastener feed mechanism 700 remains in an adjustable state, alignment tool 100 may be utilized to ensure that distal portion 730 is centered with respect to chamber 776. FIG. 8 also illustrates gripping tools 820, which are utilized to hold fasteners during the feed process. Gripping tools 820 extend from each arm 710 (i.e., along X), and hold fasteners being delivered to chamber 776 of FIG. 7. Gripping tools 820 are covered by alignment tool 100 such that gripping tools 820 fit within cut-out volume 142 whenever alignment tool 100 covers distal portion 730. A guard 810 is also depicted, which may be placed behind fastener feed mechanism 700 in order to reduce the chance of injury to an operator of fastener feed mechanism 700.

Figure 10:
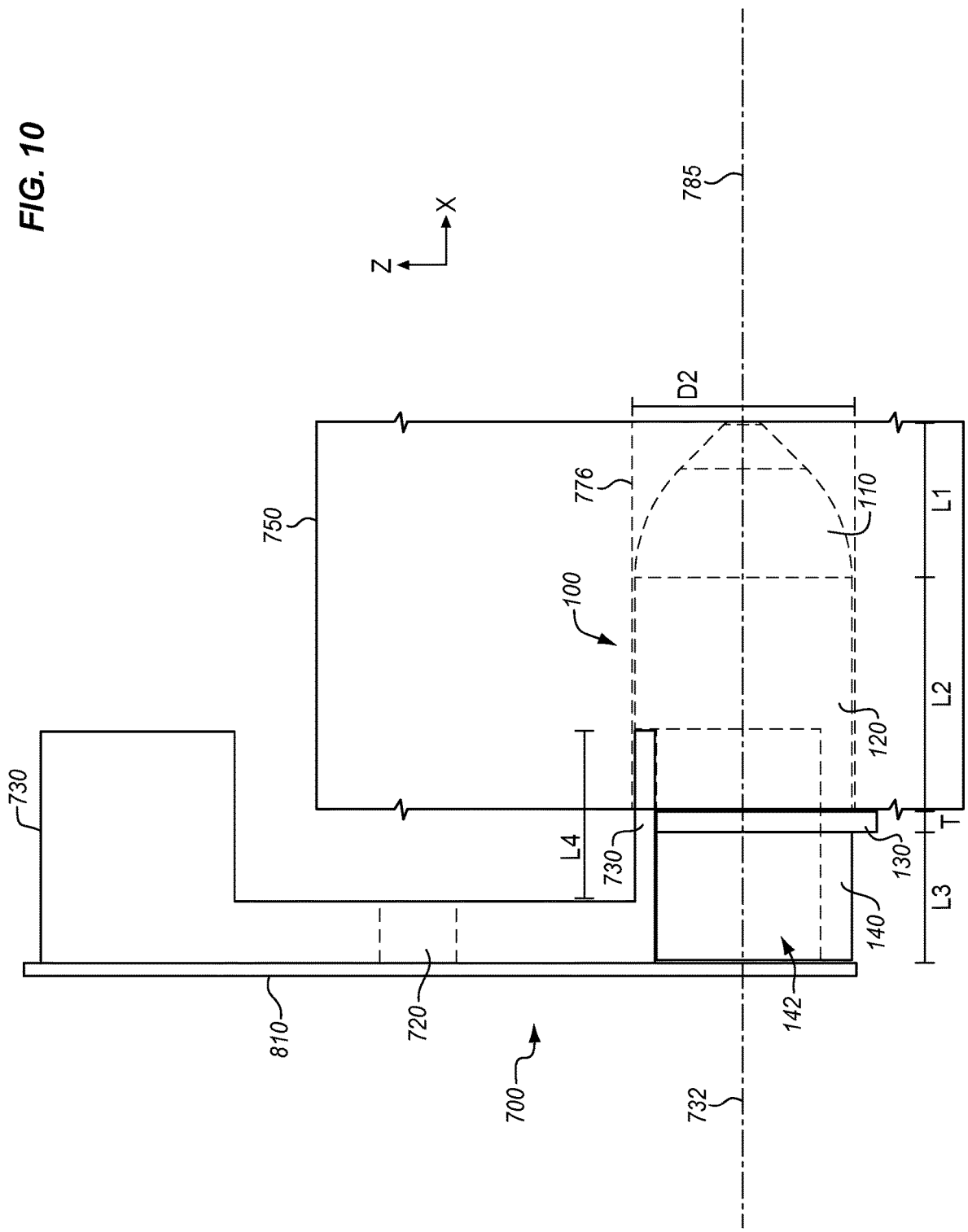

FIG. 9 is a side view of alignment tool 100 mounted to fastener feed mechanism 700. As shown in FIG. 9, L4 corresponds with a length of slip of alignment tool 100 onto distal portion 730. Further slip is prevented by physical interference between fitting member 140 and guard 810. During insertion, curvature at tip section 110 ensures that alignment tool slips into chamber 776. The length L1+L2 corresponds with a desired depth of insertion of alignment tool 100 into chamber 776, and hence ensure that tool 100 is not inserted more than a predefined amount into chamber 776. Lip 130 extends beyond D with respect to direction Z and hence is wider than chamber 776. Thus, lip 130 prevents further insertion of alignment tool 100 along direction X into chamber 776. FIG. 10 illustrates that when alignment tool 100 is fully inserted a distance of L1+L2, chamber fit section 120 fills chamber 776 and is stopped from further insertion by lip 130. Chamber fit section 120 has a diameter D corresponding with an inner diameter D2 of chamber 776. For example, in some embodiments D2 may be incrementally larger (i.e., less than one tenth or hundredth of an inch larger) than D in order to facilitate the formation of a slip fit. Thus, when fully inserted, alignment tool 100 aligns distal portion 730 with chamber 776 such that central axes 732, 150, and 785 are collinear.

Figure 11:
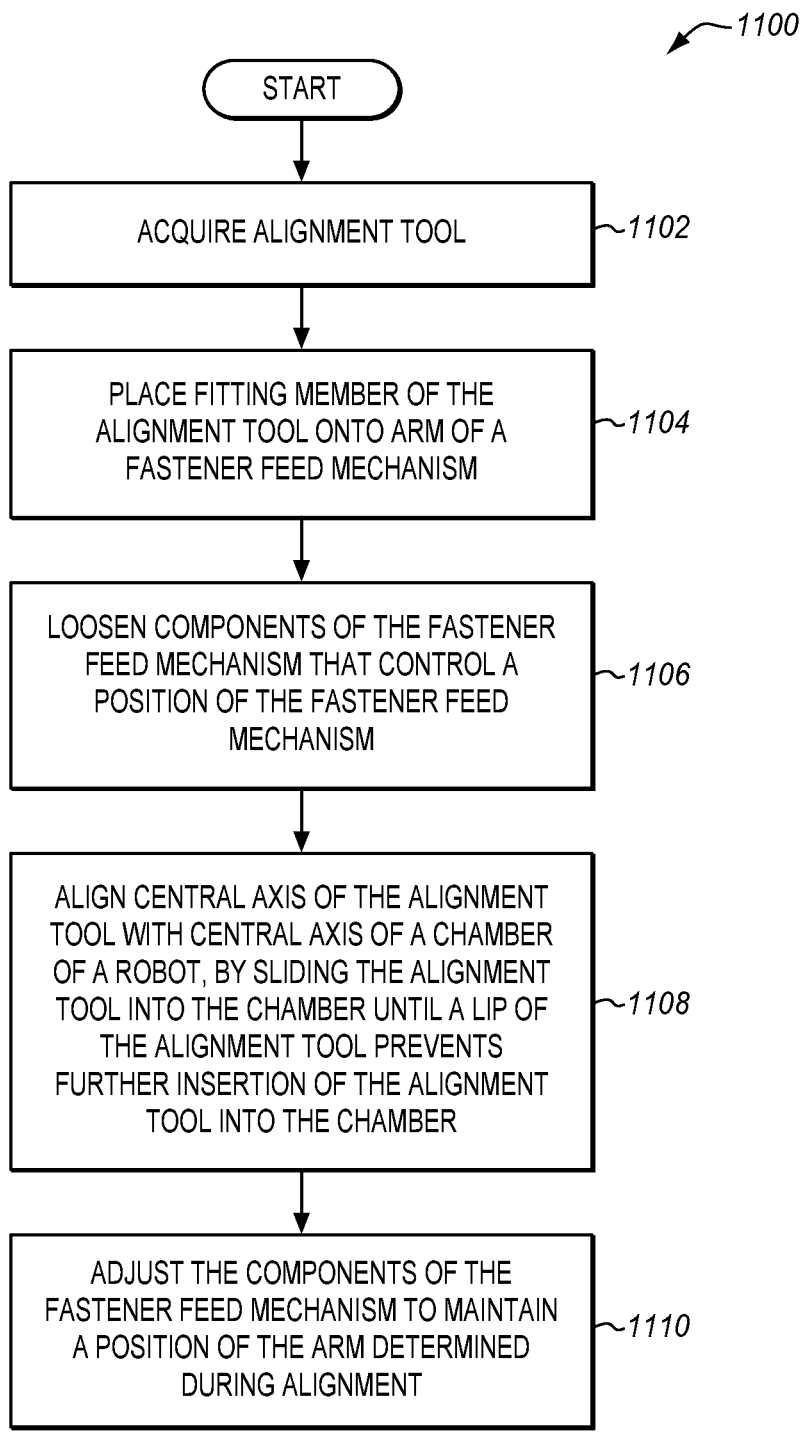
FIG. 11 is a flowchart illustrating a method for performing alignment utilizing an alignment tool in an exemplary embodiment.

Illustrative details of the operation of alignment tool 100 will be discussed with regard to FIG. 11. FIG. 11 is a flowchart illustrating a method 1100 for performing alignment utilizing an alignment tool in an exemplary embodiment. The steps of method 1100 are described with reference to alignment tool 100 of FIG. 1, but those skilled in the art will appreciate that method 1100 may be performed in other systems. The steps of the flowcharts described herein are not all inclusive and may include other steps not shown. The steps described herein may also be performed in an alternative order.

Alignment tool 100 is acquired (e.g., by selecting alignment tool 100 from multiple alignment tools of differing dimensions for L1, L2, L3, L4, D, and T) (step 1102). Fitting member 140 of alignment tool 100 is placed onto distal portion 730 of arm 710 of fastener feed mechanism 700 (step 1104). Components of fastener feed mechanism 700 that control a position of arm 710 are loosened/relaxed, enabling repositioning of fastener feed mechanism 700 along X, Y, and/or Z (step 1106). This may be performed, for example, by loosening set screws 1115 of FIG. 12 below.

Central axis 150 of alignment tool 100 is aligned with central axis 785 of chamber 776 of fastening device 750 (e.g., a robot) by sliding alignment tool 100 into chamber 776 until lip 130 of alignment tool 100 prevents further insertion of alignment tool 100 into chamber 776 (step 1108).

The components of fastener feed mechanism 700 are further adjusted (e.g., by tightening set screws 1215 of FIG. 12) to maintain a position of arm 710 determined during the alignment (step 1110). In this manner, fastener feed mechanism 700 is calibrated for delivering fasteners to chamber 776.

In further embodiments, tip section 110, chamber fit section 120, lip 130, and fitting member 140 may be removable, such that components of different dimensions may be fit together to form customized alignment tools. That is, there may be multiple chamber fit sections of different diameters and/or lengths, multiple fitting sections defining different cut-out volumes that each correspond with a different fastener feed mechanism, etc. This may help to facilitate the use of alignment tools with a wide variety of chambers and/or fastener feed mechanisms.

EXAMPLES

In the following examples, additional processes, systems, and methods are described in the context of an alignment tool for a fastener feed mechanism that operates in collaboration with a robot.

Figure 12:
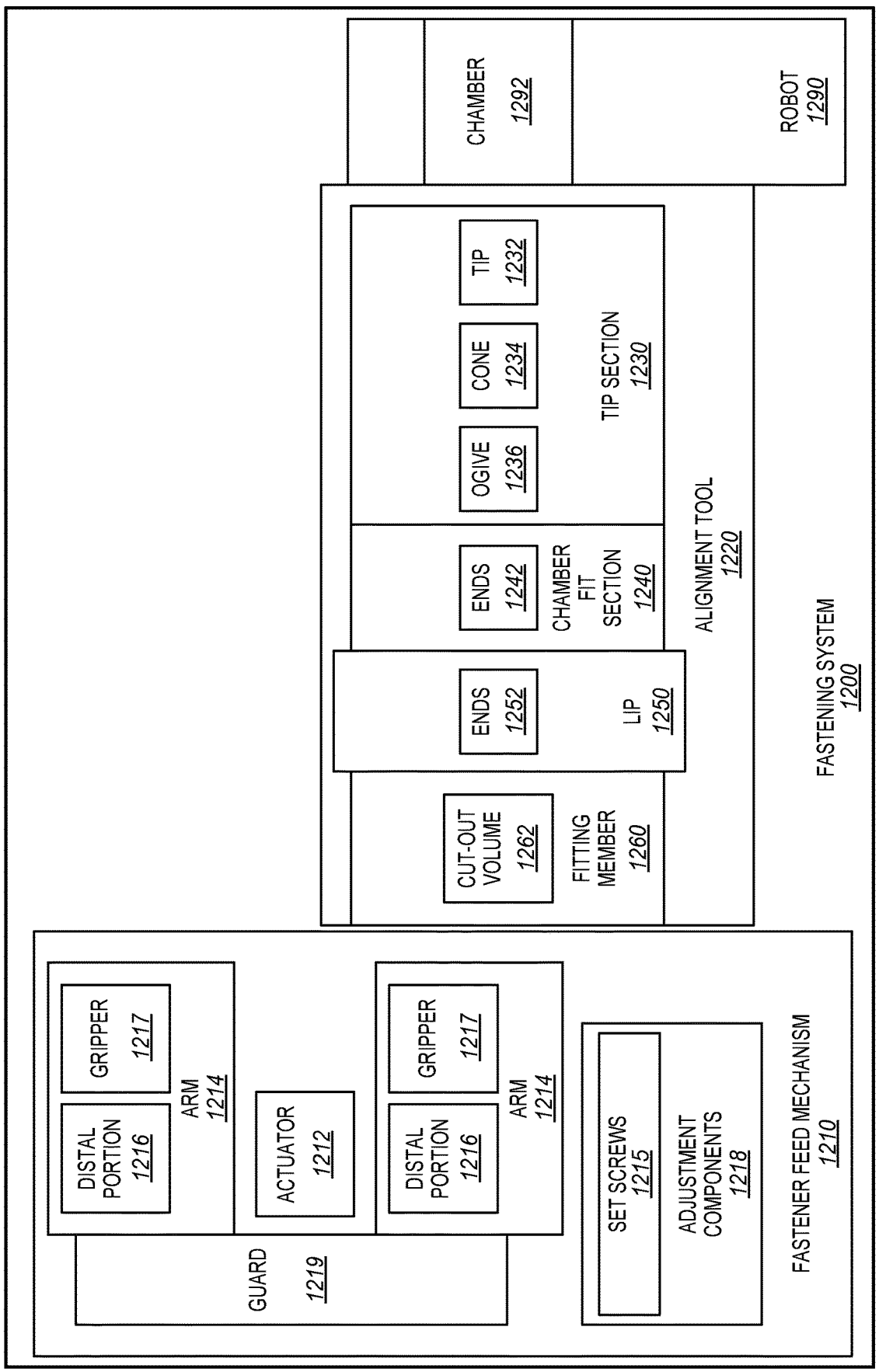
FIG. 12 is a block diagram of a system that utilizes an alignment tool in an exemplary embodiment.

FIG. 12 is a block diagram of a fastening system 1200 in an exemplary embodiment. In this embodiment, fastening system 1200 includes fastener feed mechanism 1210, alignment tool 1220, and robot 1290 which applies fasteners to a product. Fastener feed mechanism 1210 includes actuator 1212, which rotates arms 1214 during fastener deliver. Arms 1214 include distal portions 1216, and also include grippers 1217 (e.g., claw-like gripping tools). Adjustment components 1218 (e.g., combinations of rails, set screws, etc.) facilitate adjustment of an X, Y, and/or Z position of actuator 1212. By changing the position of actuator 1212, adjustment components 1218 alter the position of distal portions 1216 with respect to chamber 1292. Adjustment components 1218 therefore do not adjust the position of individual arms 1214 relative to each other. Guard 1219 is also illustrated.

Alignment tool 1220 includes tip section 1230, which itself includes tip 1232, cone 1234, and ogive 1236. Meanwhile, chamber fit section 1240 includes ends 1242, and lip 1250 includes ends 1252. The ends 1242 and ends 1252 are cut-out by cut-out volume 1262. Fitting member 1260 is also illustrated, which defines cut-out volume 1262. Alignment tool 1220 is dimensioned for insertion into chamber 1292 of robot 1290.

Figure 13:
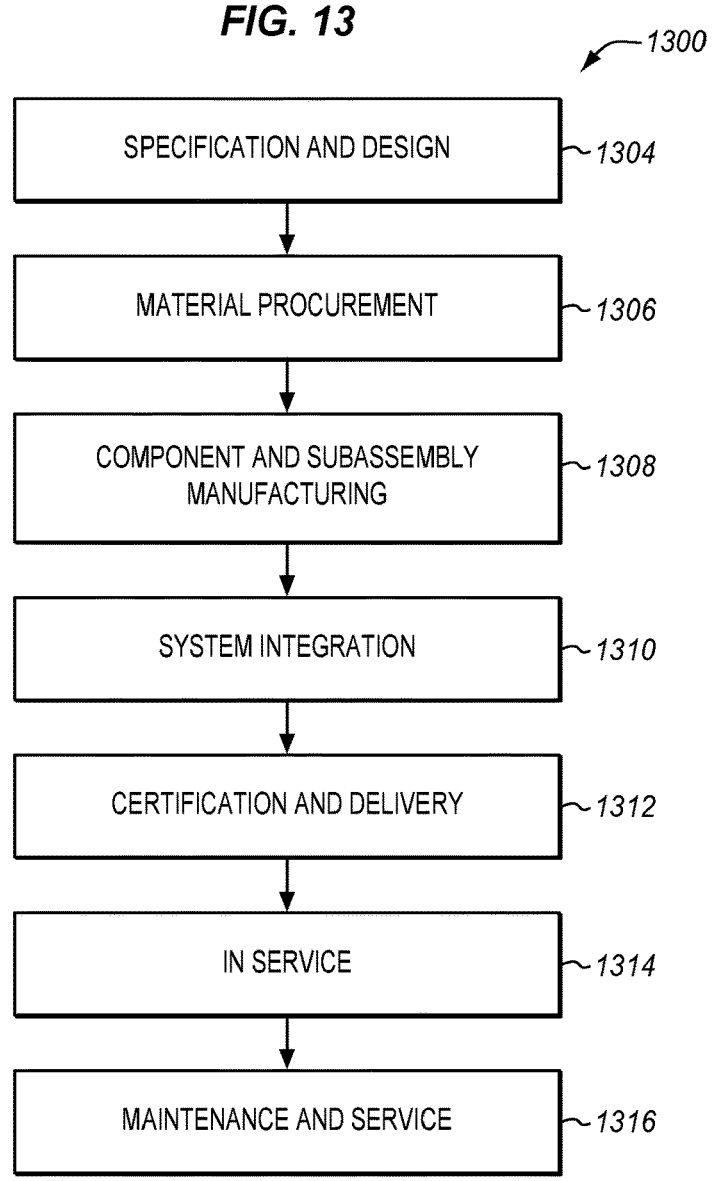
FIG. 13 is a flow diagram of aircraft production and service methodology in an exemplary embodiment.
Figure 14:
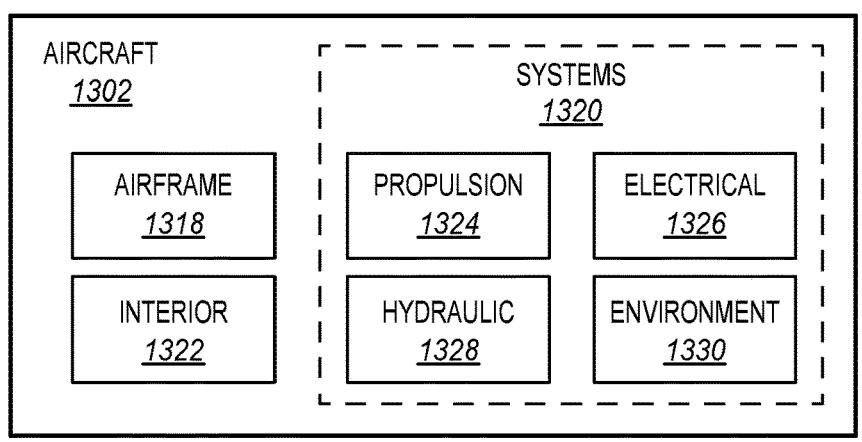
FIG. 14 is a block diagram of an aircraft in an exemplary embodiment.

Referring more particularly to the drawings, embodiments of the disclosure may be described in the context of an aircraft manufacturing and service method 1300 as shown in FIG. 13 and an aircraft 1302 as shown in FIG. 14. During pre-production, exemplary method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine maintenance and service 1316 (which may also include modification, reconfiguration, refurbishment, and so on). Apparatus and methods embodied herein may be employed during any one or more suitable stages of the production and service method 1300 (e.g., specification and design 1304, material procurement 1306, component and subassembly manufacturing 1308, system integration 1310, certification and delivery 1312, service 1314, maintenance and service 1316) and/or any suitable component of aircraft 1302 (e.g., airframe 1318, systems 1320, interior 1322, propulsion 1324, electrical 1326, hydraulic 1328, environmental 1330).

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 1302 produced by exemplary method 1300 may include an airframe 1318 with a plurality of systems 1320 and an interior 1322. Examples of high-level systems 1320 include one or more of a propulsion system 1324, an electrical system 1326, a hydraulic system 1328, and an environmental system 1330. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1300. For example, components or subassemblies corresponding to production stage 1308 may be fabricated or manufactured in a manner similar to components or subassemblies produced while the aircraft 1302 is in service. Also, one or more apparatus embodiments, method embodiments, or a combination thereof may be utilized during the production stages 1308 and 1310, for example, by substantially expediting assembly of or reducing the cost of an aircraft 1302. Similarly, one or more of apparatus embodiments, method embodiments, or a combination thereof may be utilized while the aircraft 1302 is in service, for example and without limitation, to maintenance and service 1316. For example, the techniques and systems described herein may be used for steps 1306, 1308, 1310, 1314, and/or 1316, and/or may be used for airframe 1318 and/or interior 1322. These techniques and systems may even be utilized for systems 1320, including for example propulsion 1324, electrical 1326, hydraulic 1328, and/or environmental 1330.

In one embodiment, robot 750 applies fasteners to a part of airframe 1318, and participates in component and subassembly manufacturing 1308. The part may then be assembled into an aircraft in system integration 1310, and then be utilized in service 1314 until wear renders the part unusable. Then, in maintenance and service 1316, the part may be discarded and replaced with a newly manufactured part. Inventive components and methods may be utilized throughout component and subassembly manufacturing 1308 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. An apparatus comprising:
a fastener feed mechanism comprising multiple arms that rotate about a central axis to deliver fasteners to a chamber; and
an alignment tool that is dimensioned to form a slip fit over an arm of the multiple arms, and that includes a section which protrudes from the arm and has an outer diameter corresponding with an inner diameter of the chamber.

2. The apparatus of claim 1 wherein:
the arm further includes a gripping tool, and the alignment tool defines a cut-out volume that the gripping tool fits within while the slip fit is formed.

3. The apparatus of claim 2 wherein:
the cut-out volume includes a backstop that defines a boundary of the cut-out volume, wherein the boundary is dimensioned to prevent slipping of the alignment tool onto the arm beyond a predefined amount.

4. The apparatus of claim 1 wherein:
the alignment tool further comprises a fitting member dimensioned to prevent slipping of the alignment tool onto the arm beyond a predefined amount.

5. The apparatus of claim 1 wherein:
the alignment tool further comprises a tip section having an outer diameter less than the inner diameter of the chamber.

6. The apparatus of claim 5 wherein:
the tip section comprises an ogive.

7. The apparatus of claim 1 wherein:
the alignment tool further comprises a lip, having an outer diameter greater than the inner diameter of the chamber, that prevents insertion of the alignment tool into the chamber beyond a predefined amount.

8. The apparatus of claim 1 wherein:
a position of the multiple arms relative to the chamber is adjustable.

9. A method comprising:
slip-fitting an alignment tool onto an arm of a fastener feed mechanism;
repositioning the arm into alignment with a chamber; and
sliding the alignment tool into the chamber while the alignment tool is slip-fit onto the arm.

10. The method of claim 9 wherein:
sliding the alignment tool into the chamber aligns a central axis of the alignment tool with a central axis of the chamber.

11. The method of claim 9 wherein:
slip-fitting the alignment tool comprises covering a gripping tool at the arm with a cut-out volume in the alignment tool.

12. The method of claim 9 further comprising:
adjusting components of the fastener feed mechanism to maintain a position of the arm after the sliding.

13. The method of claim 9 further comprising:
operating the fastener feed mechanism to load fasteners into the chamber.

14. The method of claim 9 further comprising:
removing the alignment tool prior to operating the fastener feed mechanism.

15. The method of claim 9 wherein:
sliding the alignment tool into the chamber is performed until a lip of the alignment tool prevents further insertion of the alignment tool into the chamber.

16. The method of claim 9 wherein:
slip-fitting the alignment tool onto the arm is performed until a backstop of the cut-out volume contacts the arm.

17. An apparatus comprising:
an alignment tool comprising:
a chamber fit section that extends in a lengthwise direction and has a diameter corresponding with a diameter of a chamber of a fastening device;
a lip that protrudes radially from the chamber beyond the diameter of the chamber; and
a fitting member that extends from the lip in the lengthwise direction.

18. The apparatus of claim 17 wherein:
the lip is dimensioned to prevent the chamber fit section from entering the chamber by more than a predefined amount.

19. The apparatus of claim 17 wherein:
the fitting member defines a cut-out volume that mates with an arm of the fastener feed mechanism.

20. The apparatus of claim 19 wherein:
the cut-out volume defined by the fitting member defines channels that correspond with locations of set screws in the arm of the fastener feed mechanism.

21. The apparatus of claim 17 further comprising:
a tip section having a diameter less than the diameter of the chamber.

22. The apparatus of claim 21 wherein:
the tip section increases in diameter according to a circular curve.

23. The apparatus of claim 17 wherein:
the chamber fit section is detachable from the lip; and
the fitting member is detachable from the lip.

* * * * *